(12) United States Patent
Pontanari

(10) Patent No.: US 9,097,291 B2
(45) Date of Patent: Aug. 4, 2015

(54) DRIVE ASSEMBLY FOR A CLUTCH UNIT AND REMOVABLE TRANSMISSION EQUIPPED WITH SAID ASSEMBLY

(71) Applicant: DANA ITALIA S.P.A., Arco (IT)

(72) Inventor: Marco Pontanari, Riva del Garda (IT)

(73) Assignee: Dana Italia SpA, Arco (IT)

( * ) Notice: Subject to any disclaimer, the term of this patent is extended or adjusted under 35 U.S.C. 154(b) by 0 days.

(21) Appl. No.: 13/261,830

(22) PCT Filed: Oct. 2, 2012

(86) PCT No.: PCT/EP2012/069460
§ 371 (c)(1),
(2) Date: Mar. 20, 2014

(87) PCT Pub. No.: WO2013/050368
PCT Pub. Date: Apr. 11, 2013

(65) Prior Publication Data
US 2014/0216884 A1  Aug. 7, 2014

(30) Foreign Application Priority Data
Oct. 3, 2011  (IT) .................. MI11A1783

(51) Int. Cl.
*F16D 25/08* (2006.01)
*F16D 25/06* (2006.01)
*F16H 63/30* (2006.01)

(52) U.S. Cl.
CPC .............. *F16D 25/06* (2013.01); *F16D 25/083* (2013.01); *F16H 63/3026* (2013.01); *F16H 2063/303* (2013.01)

(58) Field of Classification Search
CPC .................... F16D 2063/303; F16H 2063/303
USPC ............................. 192/85.57, 85.49
See application file for complete search history.

(56) References Cited

U.S. PATENT DOCUMENTS

| 1,331,139 | A | 2/1920 | Barnes |
| 4,785,926 | A | 11/1988 | Matson |
| 6,648,117 | B2 * | 11/2003 | Shoji et al. ................. 192/55.61 |
| 7,510,064 | B2 | 3/2009 | Graves |

FOREIGN PATENT DOCUMENTS

| DE | 102007057534 A1 | 6/2009 |
| EP | 0287472 A1 | 10/1988 |
| EP | 1045161 A2 | 10/2000 |
| EP | 1837544 A1 | 9/2007 |

* cited by examiner

*Primary Examiner* — Richard Lorence
*Assistant Examiner* — David Morris
(74) *Attorney, Agent, or Firm* — Marshall & Melhorn, LLC

(57) ABSTRACT

A drive assembly having an actuating piston for generating a thrust for engagement of a clutch unit. The assembly also has a bearing for transferring the engagement thrust and a pusher for discharging the engagement thrust onto the clutch unit. The actuating piston, the bearing and the pusher are assembled in succession on a transmission shaft carrying the clutch unit. A chamber is provided for supplying a fluid under pressure for generating a disengagement thrust acting on the actuating piston. At least one preloaded spring is provided that acts on the actuating piston so as to push it towards the clutch unit. The bearing for transferring the thrust is mounted with play directly on the transmission shaft. The pusher being disk-shaped and comprising a first face in lateral contact with the bearing and a second face in lateral contact with the clutch unit.

9 Claims, 4 Drawing Sheets

DRIVE ASSEMBLY FOR A CLUTCH UNIT AND REMOVABLE TRANSMISSION EQUIPPED WITH SAID ASSEMBLY

BACKGROUND OF THE INVENTION

The present invention relates to a drive assembly for a clutch unit and to a removable transmission equipped with said assembly.

FIG. 1 shows in schematic form a drive assembly for a clutch unit A according to the existing prior art.

These assemblies comprise an actuating piston D for generating an engagement thrust, a bearing C for transferring the thrust, and a pusher E for discharging the thrust onto the clutch A.

As shown, the actuating piston D, the bearing C and the pusher E are assembled in succession on a transmission shaft B carrying the clutch unit A.

At least one preloaded spring or equivalent means acting on the actuating piston D so as to push it towards the clutch unit A is provided.

In order to cause separation of the clutch, the presence of a chamber H supplying a fluid under pressure for generating a disengagement thrust acting on the actuating piston D is envisaged.

An analysis of said prior art shows that the pusher E comprises a bushing element F which acts as a ground seat for the bearing with an interference such as to prevent rotation of the latter.

Other currently known embodiments envisage a mechanical system of the keyed type or equivalent system for locking the pusher on the shaft so that it does not come off during assembly.

Both the known solutions described have drawbacks such as the high costs and long machining time.

BRIEF SUMMARY OF THE INVENTION

An object of the present invention is to provide a drive assembly for a clutch unit and a removable transmission equipped with this assembly which are able to overcome the abovementioned drawbacks of the prior art in an extremely simple, low-cost and particularly functional manner.

Another object is to provide a drive assembly for a clutch unit and a removable transmission equipped with this assembly which does not require the presence of any anti-rotational element in order to avoid any risk of seizing of the pusher on the shaft.

These objects according to the present invention are achieved by providing a drive assembly for a clutch unit and a removable transmission equipped with this assembly as explained in claims 1 and 2, respectively. Further characteristic features of the invention are described in the dependent claims.

BRIEF DESCRIPTION OF THE DRAWINGS

The characteristic features and the advantages of a drive assembly for a clutch unit and a removable transmission equipped with this assembly according to the present invention will emerge more clearly from the following description, provided by way of a non-limiting example, with reference to the accompanying schematic drawings in which.

DETAILED DESCRIPTION OF THE INVENTION

Figure 1:
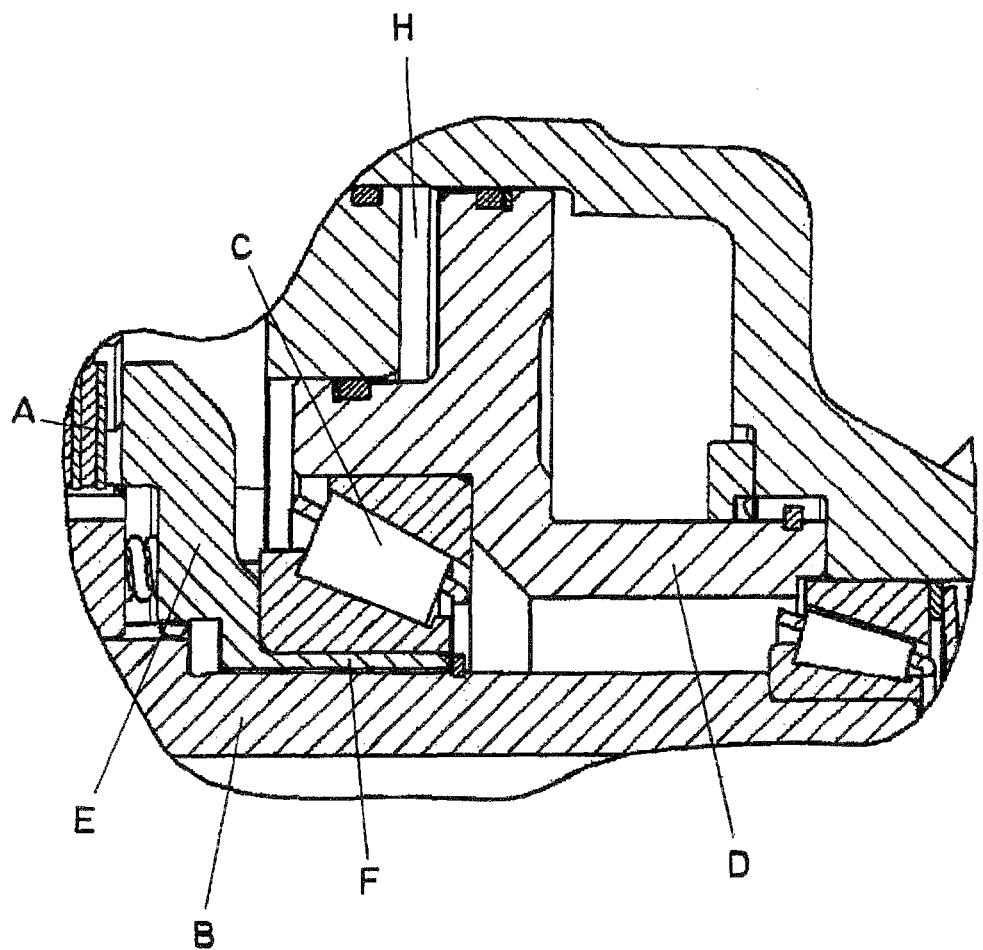
FIG. 1 is a view of a drive assembly for a clutch unit according to the prior art.

With reference to the figures, 10 denotes an example of embodiment of a drive assembly for a clutch unit according to the present invention and 100 denotes a removable transmission equipped with said assembly. This assembly 10, which can be seen in the assembled condition in FIG. 3 and in an exploded view in FIG. 4, comprises an actuating piston 12 for generating a thrust for engagement of the clutch, a bearing 13 for transferring the engagement thrust, and a pusher 14 for discharging the thrust onto the clutch unit 11. The actuating piston 12, the bearing 13 and the pusher 14 are assembled in succession on a transmission shaft 15 carrying the clutch unit 11.

A chamber 18A is envisaged for supplying a fluid under pressure for generating a disengagement thrust acting on the actuating piston 12 and at least one preloaded spring 19', 19", or equivalent means, acting on the actuating piston 12 so as to push it towards the clutch unit 11.

Figure 3:
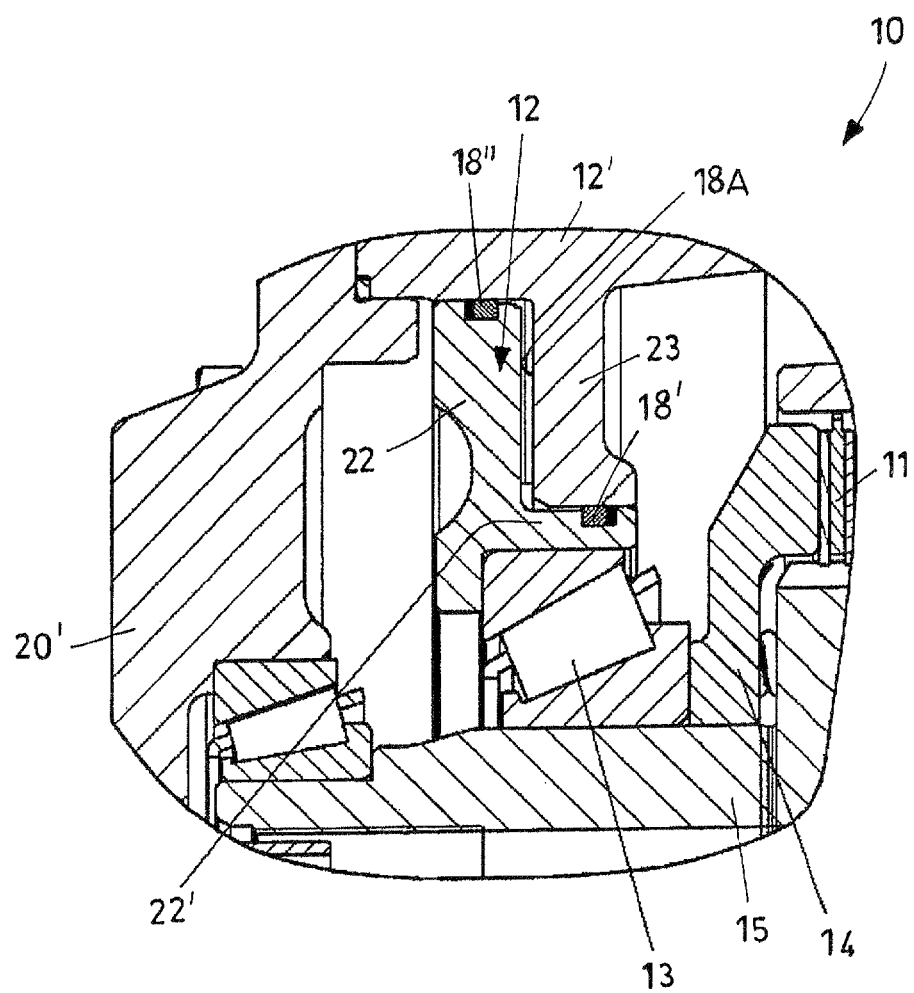
FIG. 3 shows the drive assembly of FIG. 2 enlarged.
Figure 4:
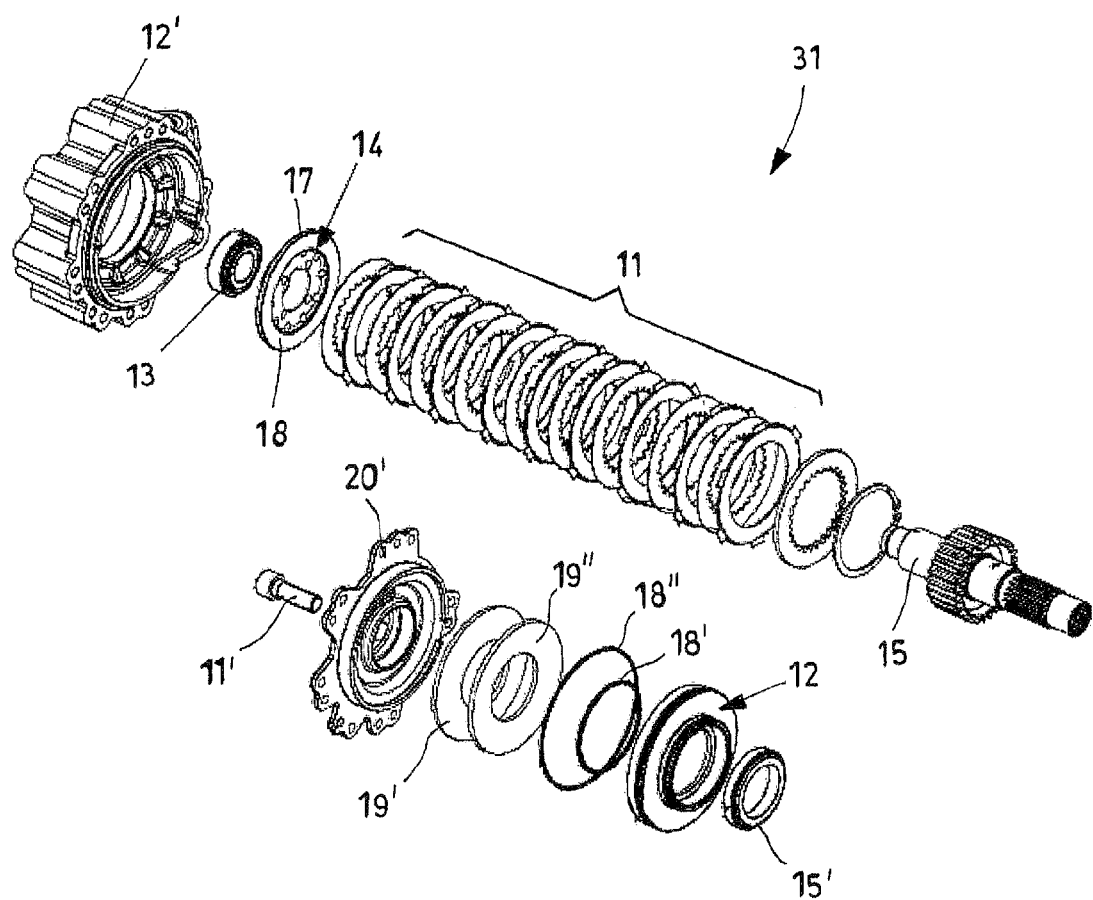
FIG. 4 shows an exploded view of a module removable independently of the transmission shown in FIG. 2, incorporating also the drive assembly shown in FIG. 3.

In particular, as shown in FIG. 3, the transfer bearing 13 is mounted with play directly on the transmission shaft 15.

In this way the pusher 14 may be disk-shaped and comprises a first face 17 in lateral contact with the bearing 13 and a second face 18 in lateral contact with the friction unit 11.

Advantageously, therefore, the pusher 14 assumes a form which is particularly simple also from the point of view of the production process, with a marked reduction in the machining time and consequently the associated costs.

The drive assembly 10 according to the general principle of the present invention and as described hitherto may be integrated in any application which envisages pushing a piston which slides on a rotating shaft.

In the continuation of the description a particular application of the many possible applications of this assembly where it is integrated in a removable transmission 100 will be illustrated in detail.

Figure 2:
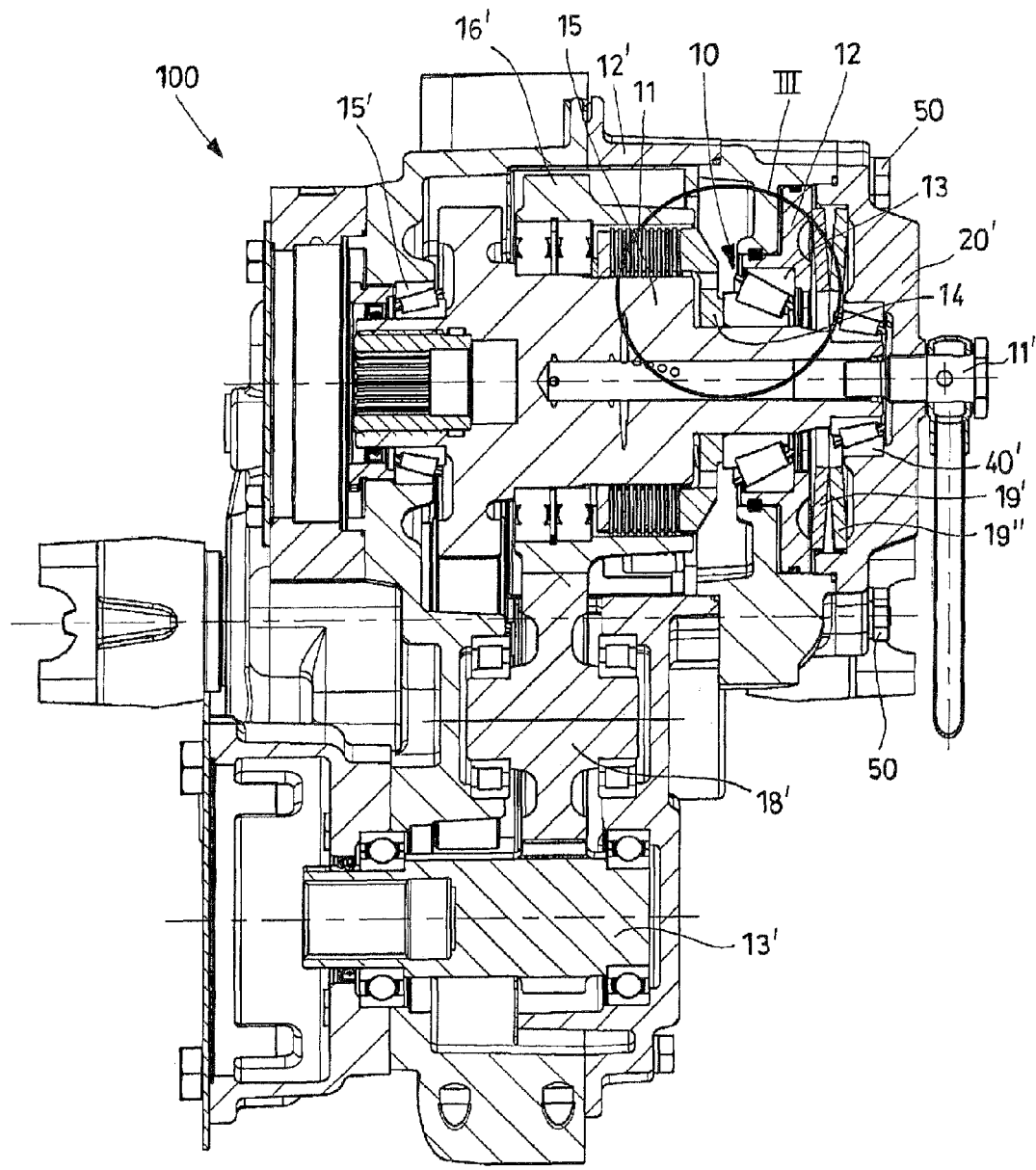
FIG. 2 shows in schematic form a removable transmission equipped with a drive assembly for a clutch unit according to the present invention.

This example, which is purely exemplary and non-limiting, is shown in FIG. 2 which illustrates a removable transmission 100 for vehicles comprising an engine for generating the motion—not shown—and an output shaft 13' for transmitting the motion to a load. The transmission 100 also comprises the transmission shaft 15 engaging with the engine, at least one first transmission gear 16' associated with the transmission shaft 15, and an output gear 18' associated with the output shaft 13'.

Furthermore, a clutch unit 11 is envisaged, said clutch unit being arranged between the gears 16', 18' and the drive assembly 10 for the clutch 11 as described above. The output gear 18' and the output shaft 13' are integrated in a first module fixed to the vehicle 11, whilst the transmission shaft 15, the transmission gear 16', the clutch unit 11 and the drive assembly 10 for the clutch unit 11 are integrated in a second module 31, shown in exploded form in FIG. 4, removable in a compact manner with respect to the remainder of the transmission.

This removable module comprises a casing 12' for lateral containment of the parts listed above, wherein the casing 12', on one side, may be associated via bolts with the frame of the vehicle and, on the other side, is closed by a lid 20'.

The lid is provided with a hole aligned with the transmission shaft 15 for delivering oil to the second module 31. The module is limited at the ends by a first bearing 40' and by a second bearing 15' mounted at the opposite ends of the transmission shaft 15.

In order to stably lock the module during removal, a threaded closing element 11' which can be associated with the hole of the lid 20' is envisaged, where this threaded closing element 11' engages with an internal threaded surface of the transmission shaft 15.

In other words, the threaded closing element 11' performs compaction of the second module 31, allowing easy removal thereof.

The chamber 18A supplying the fluid under pressure is according to the invention delimited, on one side, by the actuating piston 12 and, on the other side, by the casing 12'.

In particular, the actuating piston comprises a disk-shaped base 22 and bushing portion 22' projecting from the base towards the clutch 11, where the bushing portion 22' bears against a ring-shaped element 23 projecting inwards from the casing 12'.

In order to ensure a sealing effect, both the disk-shaped base 22 and the bushing portion 22' comprise seats for receiving sealing gaskets 18', 18" between the actuating piston 12 and the casing 12'.

Finally, it is pointed out that the assembly 10 may be combined not only with a clutch, but also with other devices, such as synchronizer or the like.

It has thus been seen how a drive assembly for a clutch unit and a removable transmission equipped with said assembly according to the present invention achieve the objects mentioned above.

In fact, the direct assembly of the transfer bearing on the shaft carrying the clutch, said assembly being performed with suitable play, reduces significantly the complexity of the system and of the individual components which form it. The pusher is therefore more compact, does not require special surface-machining operations and does not have thin portions which are more liable to damage or breakage.

Furthermore, owing to the present invention, it is not even necessary to provide an anti-rotational element to avoid any risk of seizing of the pusher on the shaft, with further simplification of the design. Finally, the transmission assembly step is simplified and therefore more efficient both as regards the time needed and as regards the costs associated therewith. The drive assembly for a clutch unit and the removable transmission equipped with this assembly according to the present invention, thus conceived, may be subject to numerous modifications and variations, all of which fall within the same inventive idea; moreover, all the details may be replaced by technically equivalent elements.

In practice, the materials used, and their dimensions, may be of any nature according to the technical requirements.

The invention claimed is:

1. A drive assembly comprising:
    an actuating piston for generating a thrust for engagement of a clutch unit;
    a bearing for transferring said engagement thrust; and
    a pusher for transferring said engagement thrust onto said clutch unit, said actuating piston, said bearing and said pusher being assembled in succession on a transmission shaft carrying said clutch unit,
    a chamber being provided for supplying a fluid under pressure for generating a disengagement thrust acting on said actuating piston, said chamber located between a ring shaped element projecting inward from a casing and said actuating piston,
    there being provided at least one preloaded spring acting on said actuating piston so as to push it towards said clutch unit,
    said bearing for transferring said thrust is mounted with play directly on said transmission shaft,
    said pusher being disk-shaped and comprising a first face in lateral contact with said bearing and a second face in lateral contact with said clutch unit.

2. The drive assembly of claim 1, further comprising an engine for generating motion, and an output shaft for transmitting said motion to a load, a transmission unit comprising the transmission shaft engaging with said engine, at least one first transmission gear associated with said transmission shaft, and an output gear associated with said output shaft, said transmission unit being equipped with the clutch unit arranged between said at least one first transmission gear and said output gear and a drive assembly for said clutch unit, said output gear and said output shaft being integrated in a first module fixed to a vehicle, whilst said transmission shaft, said transmission gear, said clutch unit and said drive assembly for said clutch unit are integrated in a second module, which is removable with respect to said first module.

3. The drive assembly of claim 2, wherein said second module comprises said casing for lateral containment which, on one side, can be associated via bolts with a frame of the vehicle and on another side is closed by a lid, said lid being provided with a hole aligned with said transmission shaft for delivering oil to said second module.

4. The drive assembly of claim 3, wherein said second module comprises a threaded closing element which can be associated with said hole of said lid, said threaded closing element engaging with an internal threaded surface of said transmission shaft for enabling compacting and removal of said second module.

5. The drive assembly of claim 3, wherein said chamber for supplying said fluid under pressure for generating said disengagement thrust acting on said actuating piston is delimited on one side by said actuating piston and on another side by said casing.

6. The drive assembly of claim 5, wherein said actuating piston comprises a disk-shaped base and a bushing portion projecting from said base towards said clutch, said bushing portion bearing against said ring-shaped element projecting inwards from said casing.

7. The drive assembly of claim 6, wherein both said disk-shaped base and said bushing portion comprise seats for receiving sealing gaskets between said actuating piston and said casing for sealing said chamber.

8. The drive assembly of claim 2, wherein said second module comprises at least one first bearing and one second bearing which are mounted at the opposite ends of said transmission shaft.

9. A drive assembly, comprising:
    an actuating piston for generating a thrust for engagement of a clutch unit;
    a bearing for transferring said engagement thrust; and
    a pusher for transferring said engagement thrust onto said clutch unit, said actuating piston, said bearing and said pusher being assembled in succession on a transmission shaft carrying said clutch unit,
    a chamber being provided for supplying a fluid under pressure for generating a disengagement thrust acting on said actuating piston,
    there being provided at least one preloaded spring acting on said actuating piston so as to push it towards said clutch unit, said bearing for transferring said thrust is mounted with play directly on said transmission shaft, said pusher being disk-shaped and comprising a first face in lateral contact with said bearing and a second face in lateral contact with said clutch unit, an engine for generating motion, and an output shaft for transmitting said motion to a load, a transmission unit comprising the transmission shaft engaging with said engine, at least one first transmission gear associated with said transmission shaft, and an output gear associated with said output shaft, said transmission unit being equipped with the clutch unit arranged between said at least one first transmission gear and said output gear and a drive assembly for said clutch unit, said output gear and said output shaft being integrated in a first module fixed to a vehicle, whilst said transmission shaft, said transmission gear, said clutch unit and said drive assembly for said clutch unit are integrated in a second module, which is removable with respect to said first module, wherein said second module comprises a casing for lateral containment which, on one side, can be associated via bolts with a frame of the vehicle and on another side is closed by a lid, said lid being provided with a hole aligned with said transmission shaft for delivering oil to said second module, wherein said second module comprises at least one first bearing and one second bearing which are mounted at the opposite ends of said transmission shaft, wherein said second module comprises a threaded closing element which can be associated with said hole of said lid, said threaded closing element engaging with an internal threaded surface of said transmission shaft for enabling compacting and removal of said second module.

* * * * *